(12) United States Patent
Ito et al.

(10) Patent No.: US 10,290,396 B2
(45) Date of Patent: May 14, 2019

(54) WIRING HARNESS HAVING WATERPROOFING AGENT WITH REACTIVE ADHESIVE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Kenji Ito, Mie (JP); Tatsuya Hase, Mie (JP); Kazuo Nakashima, Mie (JP); Kohei Kobayashi, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/526,796

(22) PCT Filed: Nov. 6, 2015

(86) PCT No.: PCT/JP2015/081288
§ 371 (c)(1),
(2) Date: May 15, 2017

(87) PCT Pub. No.: WO2016/084581
PCT Pub. Date: Jun. 2, 2016

(65) Prior Publication Data
US 2017/0338005 A1 Nov. 23, 2017

(30) Foreign Application Priority Data
Nov. 28, 2014 (JP) ................................. 2014-241339

(51) Int. Cl.
*H01B 7/282* (2006.01)
*H02G 1/14* (2006.01)
(Continued)

(52) U.S. Cl.
CPC ........... *H01B 7/282* (2013.01); *H01B 7/0045* (2013.01); *H01R 4/183* (2013.01); *H01R 4/70* (2013.01);
(Continued)

(58) Field of Classification Search
None
See application file for complete search history.

(56) References Cited

U.S. PATENT DOCUMENTS

| 433,920 | A | * | 8/1890 | Wiley et al. | ............. | H01R 4/70 |
| | | | | | | 174/84 R |
| 1,011,118 | A | * | 12/1911 | Carolan | ................... | H01R 4/70 |
| | | | | | | 174/71 R |

(Continued)

FOREIGN PATENT DOCUMENTS

| JP | 2005261184 A | 9/2005 |
| JP | 2009136039 A | 6/2009 |

(Continued)

OTHER PUBLICATIONS

International Search Report and Written Opinion for application PCT/JP2015/081288 dated Feb. 2, 2016; 6 Pages.

*Primary Examiner* — Chau N Nguyen
*Assistant Examiner* — Muhammed Azam
(74) *Attorney, Agent, or Firm* — Reising Ethington, P.C.

(57) ABSTRACT

A wiring harness capable of reliably blocking a leak path after an endurance test and exhibiting a good waterproof performance over a long period of time. The wiring harness has a waterproof structure in which a spliced portion is formed by joining conductors that are exposed by partially (Continued)

removing coating materials, and a conductor exposed portion composed of a bundle of the exposed conductors. An outer peripheral surface of each coating material end part of each insulated wire adjacent to the conductor exposed portion are continuously covered with a waterproofing agent to seal the conductor exposed portion and is configured using a reactive adhesive having a gel fraction in a range of 20 to 70% as the waterproofing agent.

8 Claims, 6 Drawing Sheets (51) Int. Cl.
   *H01B 7/00* (2006.01)
   *H01R 4/70* (2006.01)
   *H01R 4/18* (2006.01)
   *H02G 15/18* (2006.01)
   *B60R 16/02* (2006.01)

(52) U.S. Cl.
   CPC .............. *H02G 1/14* (2013.01); *H02G 15/18* (2013.01); *B60R 16/0207* (2013.01); *Y02A 30/14* (2018.01)

(56) References Cited

U.S. PATENT DOCUMENTS

| | | | | |
|---|---|---|---|---|
| 3,708,611 | A * | 1/1973 | Dinger | B29C 61/0616 174/84 C |
| 4,595,724 | A * | 6/1986 | Koblitz | C08K 3/22 174/74 A |
| 4,863,535 | A * | 9/1989 | More | H01R 4/70 156/49 |
| 4,963,698 | A * | 10/1990 | Chang | H01R 4/70 156/49 |
| 5,313,019 | A * | 5/1994 | Brusselmans | C08L 53/02 174/77 R |
| 6,242,097 | B1 * | 6/2001 | Nishiguchi | B32B 27/08 174/110 N |
| 6,303,865 | B1 * | 10/2001 | Yamamoto | H01R 4/70 174/17.08 |
| 7,572,979 | B2 * | 8/2009 | Otsuki | H01R 13/5213 174/84 R |
| 8,076,579 | B2 * | 12/2011 | Ikeda | H01R 4/70 174/72 C |
| 9,407,051 | B2 * | 8/2016 | Katou | H01R 4/70 |
| 9,824,792 | B2 * | 11/2017 | Nakashima | H01B 7/282 |
| 2005/0261184 | A1 | 11/2005 | Kaufman | |
| 2006/0048965 | A1 * | 3/2006 | Ootsuki | H01R 4/22 174/74 A |
| 2006/0121773 | A1 * | 6/2006 | Ichikawa | H01R 4/70 439/408 |
| 2008/0296041 | A1 * | 12/2008 | Fukuchi | H01B 3/441 174/110 R |
| 2009/0272491 | A1 * | 11/2009 | Kobayashi | C09J 7/38 156/327 |
| 2010/0022119 | A1 * | 1/2010 | Desard | H01R 4/36 439/540.1 |
| 2011/0290468 | A1 * | 12/2011 | Nakayama | C09J 9/00 165/185 |
| 2012/0100359 | A1 * | 4/2012 | Kishioka | C09J 7/0217 428/220 |
| 2012/0247828 | A1 | 10/2012 | Kakuta | |
| 2013/0095708 | A1 * | 4/2013 | Mitose | H01R 4/184 439/878 |
| 2013/0122288 | A1 * | 5/2013 | Miki | C09J 133/066 428/343 |
| 2014/0194003 | A1 * | 7/2014 | Nabeta | H01R 4/185 439/604 |
| 2014/0284099 | A1 * | 9/2014 | Saito | H01B 7/2825 174/70 R |
| 2014/0299353 | A1 * | 10/2014 | Saito | H01B 7/282 174/113 R |
| 2014/0356615 | A1 * | 12/2014 | Komatsuzaki | C09J 7/0289 428/315.5 |
| 2015/0068800 | A1 * | 3/2015 | Yamasaki | H02G 15/1806 174/72 A |
| 2015/0270628 | A1 * | 9/2015 | Kalass | H01R 4/72 307/10.1 |
| 2015/0340848 | A1 * | 11/2015 | Nakashima | C08G 18/4825 174/72 A |
| 2015/0364233 | A1 * | 12/2015 | Asami | H01R 43/005 29/869 |

FOREIGN PATENT DOCUMENTS

| | | | | |
|---|---|---|---|---|
| JP | 2011113694 | A | 6/2011 | |
| JP | 2012144701 | A | 8/2012 | |
| JP | 2013251166 | A | 12/2013 | |
| JP | 2015176860 | A | 10/2015 | |
| WO | WO2012042979 | * | 4/2012 | ............ H01R 43/20 |

* cited by examiner

WIRING HARNESS HAVING WATERPROOFING AGENT WITH REACTIVE ADHESIVE

TECHNICAL FIELD

The present invention relates to a wiring harness and particularly to a wiring harness suitably used as an automotive wiring harness in which waterproofing is applied to spliced portions such as intermediate spliced portions and end spliced portions having coatings removed at intermediate parts and ends of wires or shielded cables.

BACKGROUND ART

An in-vehicle wiring harness is exposed in a high-temperature environment during use. Further, waterproof performance is required for spliced portions of the wiring harness. A waterproofing agent is used for the spliced portions of the wiring harness exposed in such a high-temperature environment.

A resin composition as a water sealant (waterproofing agent) or the like is used to be reliably filled between twisted strands of a wire conductor and block leak paths among a plurality of wires of the wiring harness. For example, a method using a low-viscosity resin having a low contact angle, a method using a special means such as depressurization, pressurization or inclination, a method using an ultraviolet curable resin and the like are known to be applied for wire coatings and wire conductors (see, for example, patent literature 1).

CITATION LIST

Patent Literature

Patent Literature 1: Japanese Unexamined Patent Publication No. 2009-136039

SUMMARY OF INVENTION

Technical Problem

According to the above conventional technique, the waterproofing agent can be reliably permeated between the strands and waterproof performance in an initial stage can be satisfied. However, it has been difficult to maintain 100% of waterproof performance after an endurance test such as a high-temperature storage test or a high-temperature high-humidity test taking into account of an in-vehicle environment.

Further, in the waterproofing method described in the above patent literature 1, core exposed parts at both ends of the spliced portion are sealed with an adhesive made of photosetting silicone resin so that an adhesive coated as the waterproofing agent does not flow out from a predetermined range. This waterproofing method has good water sealing performance also after the endurance test. However, there is a problem that the adhesive flows out if an adhesive coated part is pressed from outside.

Even if the waterproofing agent can be filled among the strands of the wire conductors in waterproofing the spliced portion, an adhesive force decreases such as due to a reduction of wire diameters, reaction forces of the wires and the transfer of a plasticizer from the wire coating materials to the waterproofing agent after the endurance test. If the adhesive force of the waterproofing agent decreases, leak paths are formed between the wire coatings and the waterproofing agent and moisture easily intrudes, wherefore it becomes difficult to prevent corrosion.

The present invention was developed to solve the problems of the above conventional technique and aims to provide a wiring harness capable of reliably blocking a leak path after an endurance test and exhibiting a good waterproof performance over a long period of time.

Solution to Problem

The present invention is directed to a wiring harness having a waterproof structure in which a conductor exposed portion composed of a bundle of exposed conductors of a plurality of insulated wires, the bundle including a spliced portion formed by joining the conductors of the plurality of insulated wires in a conductor part where each of coating materials of the plurality of insulated wires is partially removed to be exposed, and an outer peripheral surface of each coating material end part of each insulated wire adjacent to the conductor exposed portion are continuously covered with a waterproofing agent to seal the conductor exposed portion, wherein a reactive adhesive having a gel fraction in a range of 20 to 70% is used as the waterproofing agent.

The gist of the present invention is to use the reactive adhesive having a gel fraction in the range of 20 to 70% as the waterproofing agent.

In the wiring harness of the present invention, the reactive adhesive is preferably an ultraviolet curable crosslinked acrylic adhesive.

In the wiring harness of the present invention, the reactive adhesive is preferably a two-component curable crosslinked acrylic adhesive.

In the wiring harness of the present invention, the coating material of the insulated wire is preferably made of soft or semi-rigid polyvinyl chloride resin.

In the wiring harness of the present invention, the spliced portion can be formed as an intermediate spliced portion or an end spliced portion.

Effects

The wiring harness of the present invention can reliably block a leak path after an endurance test and exhibit a good waterproof performance over a long period of time by using the reactive adhesive having a gel fraction in the range of 20 to 70% as the waterproofing agent.

The good waterproof performance is obtained by the above configuration of the present invention due to the following function. Insulated wires of a wiring harness become thinner due to a reduction of a plasticizer of coating materials of the insulated wires in a high-temperature environment. Then, a waterproofing agent filled between the wires is strained. As a result, clearances and the like are easily formed between the waterproofing agent and the wires. In contrast, since the reactive adhesive having a gel fraction in the range of 20 to 70% does not become too hard and can maintain flexible adhesion even if being exposed in a high-temperature environment, the adhesive is filled, following the above clearances and the like. Thus, satisfactory adhesion is exhibited even in a high-temperature environment and a leak path can be reliably blocked.

BRIEF DESCRIPTION OF DRAWINGS

FIGS. 5A-5E are diagrams showing a wiring harness manufacturing method of an embodiment, where

EMBODIMENTS OF INVENTION

Figure 1:
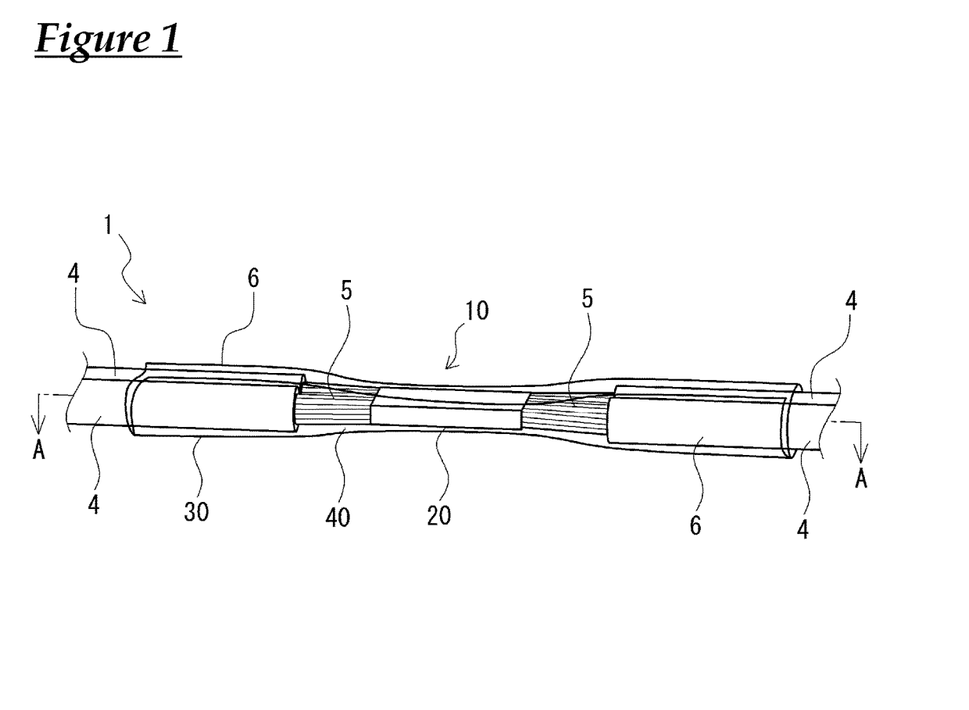
FIG. 1 is a perspective view showing the external appearance near an intermediate spliced portion of an example of a wiring harness of the present invention.
Figure 2:
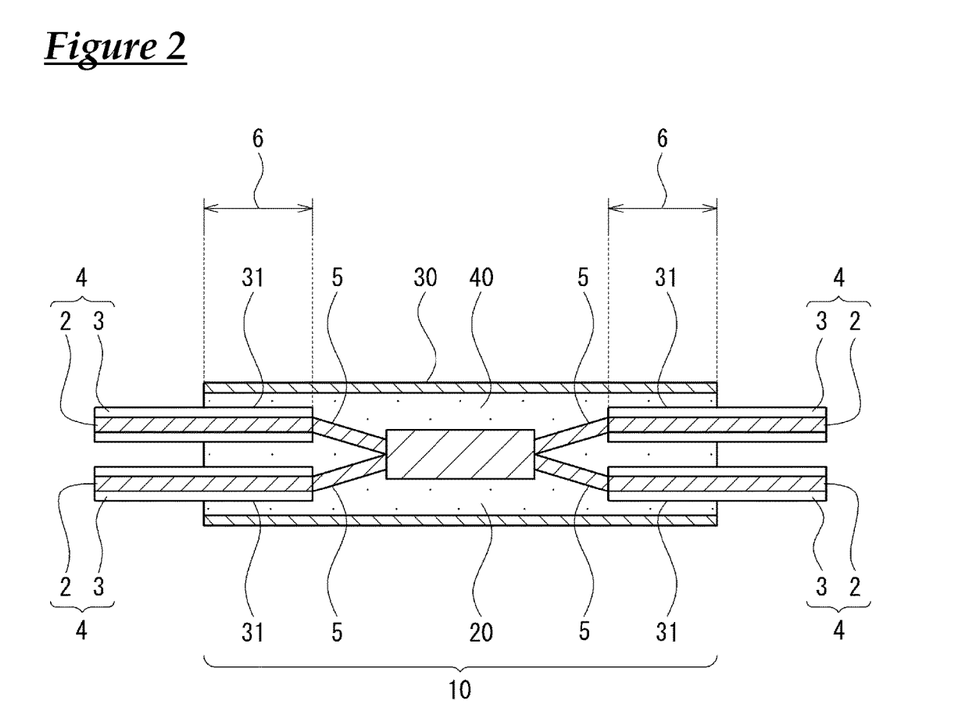
FIG. 2 is a horizontal section along A-A of FIG. 1.

Hereinafter, an embodiment of the present invention is described in detail. FIG. 1 is a perspective view showing the external appearance near an intermediate spliced portion of an example of a wiring harness of the present invention, and FIG. 2 is a horizontal section along A-A of FIG. 1. A wiring harness 1 shown in FIGS. 1 and 2 is composed of a wire bundle formed by bundling four insulated wires 4 in each of which the periphery of a conductor 2 formed by a core is covered with a coating material 3 made of an insulator.

An intermediate spliced portion 20 of the wiring harness 1 includes a conductor exposed portion 5 in which a bundle of the conductors 2 inside is exposed by partially peeling and removing each of the coating materials 3 of a plurality of insulated wires 4 of the wire bundle. In the conductor exposed portion 5, the conductors 2 of the plurality of insulated wires 4 are joined to each other to form a spliced portion and the respective insulated wires 4 are electrically connected. Since the above spliced portion is formed in an intermediate part other than on an end of the wire bundle, this spliced portion is called the intermediate spliced portion 20.

In the wiring harness 1, a waterproof portion 10 is configured by covering the periphery of the intermediate spliced portion 20 with a waterproofing agent 40 and further covering the periphery of the waterproofing agent 40 with a protective sheet 30. The intermediate spliced portion 20 of the waterproof portion 10 includes the conductor exposed portion 5 composed of a bundle of the exposed conductors of the plurality of insulated wires and covered portions 6 which are adjacent to the conductor exposed portion 5 and in which the outer peripheral surfaces of end parts of the respective coating materials 3 of the respective insulated wires 4 are continuously covered with the waterproofing agent 40, and has a waterproof structure by which the conductor exposed portions 5 are sealed.

A hardened material of a reactive adhesive is used as the waterproofing agent 40 of the waterproof portion 10. A gel fraction of the hardened material as the reactive adhesive is in a range of 20 to 70%. If the gel fraction of the hardened material of the reactive adhesive is below 20%, the reactive adhesive may flow out if a high temperature is reached when the reactive adhesive is heated in a state sealing the spliced portion. Further, if the gel fraction exceeds 70%, a sufficient adhesive force cannot be exhibited and waterproof performance cannot be satisfied. Since the gel fraction of the hardened material of the reactive adhesive is in the range of 20 to 70%, the waterproofing agent 40 can flexibly follow deformation in response to a reduction of wire diameters, increases of distances between the wires due to reaction forces of the wires and the like even after the wiring harness is kept in a high-temperature state such as after an endurance test. Therefore, waterproof performance can be maintained by preventing the formation of a leak path.

The gel fraction of the waterproofing agent 40 represents a degree of crosslinking of the adhesive. The gel fraction of the present invention is a numerical value obtained by the following equation by measuring the mass of the crosslinked waterproofing agent (reactive adhesive), taking out the waterproofing agent after the waterproofing agent was immersed in an ethyl acetate solution of 23° C. for 20 hours, drying the waterproofing agent at 120° C. for 1 hour and measuring the mass.

Gel fraction (%)=(mass after drying/mass before immersion)×100

The reactive adhesive of the waterproofing agent 40 can be coated at normal temperature and is not particularly limited if the reactive adhesive can be crosslinked and cured. Known various reaction adhesives such as rubber-based, acrylic-based, silicone-based, urethane-based reactive adhesives and the like can be specifically used as the reactive adhesive. Examples of the rubber-based reactive adhesive include natural rubber, styrene-butadiene-styrene block copolymer (SBS), styrene-butadiene rubber (SBR) and butyl rubber (IIR). Further, examples of the acrylic-based reactive adhesive include (meth)acrylic ester copolymers.

If necessary, the reactive adhesive may contain a tackifier, a softener, an antioxidant, a filler and the like besides a main component and a crosslinking agent.

Acrylic adhesives such as an ultraviolet curable crosslinked acrylic adhesive and a two-component curable acrylic adhesive are preferably used as the reactive adhesive.

A degree of crosslinking of the reactive adhesive may be appropriately adjusted to set the gel fraction of the waterproofing agent 40 in the above predetermined range. Specifically, if the reactive adhesive is an ultraviolet curable crosslinked acrylic adhesive, an irradiation amount of curing light such as ultraviolet rays may be adjusted. Further, if the reactive adhesive is a two-component curable crosslinked acrylic adhesive, an addition amount of a curing agent such as a crosslinking agent may be appropriately adjusted.

A known adhesive can be used as the ultraviolet curable crosslinked acrylic adhesive. The ultraviolet curable crosslinked acrylic adhesive can be, for example, composed of a (meth)acrylate component such as a (meth)acrylate monomer or an oligomer, a tackifier, a crosslinking agent, a photoinitiator and the like. A composition of the ultraviolet curable crosslinked acrylic adhesive can effectively prevent an outflow by reducing fluidity in a shorter time by the irradiation of light such as ultraviolet rays after being coated.

The (meth)acrylate component is not particularly limited if being a compound including one or more (meth)acrylate groups in a molecule and a conventionally known one can be used as such. Examples of the (meth)acrylate group include a (meth)acrylate oligomer and a (meth)acrylate monomer. "(Meth)acrylate" in the present invention means methacrylate and acrylate.

The two-component curable crosslinked acrylic adhesive is an adhesive containing a polymer of acrylic ester as an adhesive main component and is obtained such as by solution polymerization and a solvent acrylic adhesive can be used as such.

The solvent acrylic adhesive is preferably composed of an acrylic ester copolymer, an acrylic ester monomer and the like. Isocyanate, epoxy, urethane, metal alkoxide and the like are, for example, used as a curing agent of the solvent acrylic adhesive.

The waterproofing agent 40 is cured by having ultraviolet rays irradiated to the adhesive if the reactive adhesive is an ultraviolet curable crosslinked acrylic resin. Irradiation light may also be visible light besides ultraviolet rays. Various conventionally known ultraviolet irradiation devices can be used as an ultraviolet irradiation device. Further, irradiation conditions of the ultraviolet rays can also be appropriately set according to each ultraviolet curable material.

The waterproofing agent 40 is heated or crosslinked and cured at normal temperature after a main agent and the curing agent are mixed and coated if the reactive adhesive is the two-component curable crosslinked acrylic adhesive. A heating condition in the case of crosslinking by heating is preferably, for example, 130° C. or lower.

A viscosity of the reactive adhesive used in the waterproofing agent 40 is preferably in a range of 0.5 to 30 Pa·s on coating conditions before curing. If the viscosity is in the above range, the permeability of the waterproofing agent into clearances between the conductors and the like and retentivity to remain without flowing down during coating are suitably balanced and waterproof performance and operability can be easily combined.

In the wiring harness shown in FIGS. 1 and 2, the protective sheet 30 is flexible to be deformable, following and in response to the deformation of the surface of the waterproofing agent 40. The protective sheet 30 covers the periphery of the waterproofing agent 40 while being in close contact with the surface of the waterproofing agent 40. The waterproofing agent 40 is cured by having ultraviolet rays irradiated thereto while being permeated into the inside of the conductor exposed portion 5 of the insulated wires.

Further, the waterproofing agent 40 of the waterproof portion 10 is cured while being in close contact with the surfaces of the coating materials 3 of the insulated wires 4 adjacent to the conductor exposed portion 5. In the waterproof portion 10, the waterproofing agent 40 covers the peripheries of the covered portions 6 before and after the conductors of the insulated wires 4 adjacent to the conductor exposed portion. The intrusion of moisture through clearances between the coating materials 3 and the conductors 2 is prevented by the waterproofing agent 40 covering the covered portions 6 in this way.

The use of semi-rigid vinyl chloride resin or soft vinyl chloride resin containing polyvinyl chloride and a plasticizer for the coating material 3 of the insulated wire 4 used in the wiring harness 1 is preferable because of good properties and inexpensive price. Examples of the plasticizer include phthalic acid ester-based plasticizers such as diisononyl phthalate (DINP), trimellitic acid ester-based plasticizers such as tri-2-ethylhexyl trimellicate, aliphatic dibasic acid ester-based plasticizers such as 2-ethylhexyl adipate and dibutyl sebacicate, epoxy-based plasticizers such as epoxidized soybean oil, and phosphoric acid ester-based plasticizers such as tricresyl phosphate.

The conductor 2 of the insulated wire 4 is composed of a twisted wire formed by twisting a plurality of strands. The twisted wire may be composed of one type of metal strands or may be composed of two or more types of metal strands. Copper, copper alloy, aluminum and the like are, for example, used for the metal strands of the conductor 2. The twisted wire may include strands and the like made of organic fibers besides the metal strands. That the twisted wire is composed of one type of metal strands means that all the metal strands constituting the twisted wire are made of the same metal material, and that the twisted wire is composed of two or more types of metal strands means that metal strands made of mutually different metal materials are included in the twisted wire. Reinforcing wires (tension members) and the like for reinforcing the coated wire may be contained in the twisted wire.

The intermediate spliced portion 20 is formed by partially removing the coating material 3 in a longitudinal intermediate part of the insulated wire 4 and joining the conductors 2 of the other insulated wires 4 to this conductor 2. The conductors 2 of the other insulated wires 4 may be exposed in longitudinally intermediate parts of these insulated wires 4 or may be exposed at end parts of these insulated wires 4. Here, an example of the latter is described. Further, in the wiring harness 1, the number of the insulated wires 4 is not limited to four and has only to be plural.

In the intermediate spliced portion 20, the conductors 2 can be joined using means, e.g. welding such as resistance welding, ultrasonic welding or laser welding. Further, the conductor 2 may be joined in the intermediate spliced portion 20 using a method for crimping a component such as an intermediate crimping terminal to a joint part.

The protective sheet 30 covers the surface of the waterproofing agent 40 while being in close contact with the surface of the waterproofing agent 40. The protective sheet 30 has permeability to irradiation light such as ultraviolet rays in curing the reactive adhesive of the waterproofing agent 40. The light permeability of the protective sheet 30 is, for example, such that an ultraviolet transmittance is preferably 50% or higher and more preferably 90% or higher. A thickness of the protective sheet 30 is preferably 100 μm or smaller and more preferably 5 to 50 μm.

Wrap sheets made of olefin-based resins such as polyethylene, polypropylene, polyvinyl chloride, polyvinylidene chloride and polyvinylidene fluoride or wrap sheets made of general purpose resins such as polyester, polyethylene terephthalate and nylon can be used as the protective sheet 30. Sheets made of polyvinyl chloride resin, polyvinylidene chloride resin and polyvinylidene fluoride resin having good self-adhesion (tackiness) are particularly preferable as the protective sheet 30.

A method for manufacturing the wiring harness including the above intermediate spliced portion is described below. First, a wire bundle 7 formed with the intermediate spliced portion 20 is prepared in advance using a plurality of insulated wires. The wire bundle 7 includes the conductor exposed portion 5 in which the coating materials 3 of the insulated wires 4 are removed to expose the conductors 2 inside. Then, the protective sheet 30 of a size capable of covering the intermediate spliced portion 20 and parts of the coating materials 3 of the insulated wires at both sides of the intermediate spliced portion 20 is prepared and the intermediate spliced portion 20 of the wire bundle 5 is placed on the protective sheet. Subsequently, the waterproofing agent 40 is supplied onto the intermediate spliced portion 20.

Subsequently, the protective sheet 30 is wound around the intermediate spliced portion 20 and the waterproofing agent 40. An overlapped part of the protective sheet 30 is held overlapped by the self-adhesion of the protective sheet 30. Inside the protective sheet 30, the waterproofing agent 40 covers the entire outer periphery of the intermediate spliced portion 20 and parts of the coating materials. In this state, ultraviolet rays are irradiated to the intermediate spliced portion 20 using the ultraviolet irradiation device to cure the waterproofing agent 40.

Light sources such as valve-type UV lamps having Hg, Hg/Xe and metal halide compounds sealed therein and LED-UV lamps can be used as the above ultraviolet irradiation device. Further, a condensation type UV irradiation device for condensing and irradiating light from the above light source by a reflection mirror may be used as the above ultraviolet irradiation device.

The spliced portion of the wiring harness of the present invention is not limited to the above mode. Specifically, although the spliced portion is provided at an intermediate part of the wire bundle in the wiring harness of the above mode, the spliced portion may be provided on an end part of the wire bundle. In that case, a waterproof structure in which a core exposed portion of the end spliced portion is sealed by a waterproofing agent can be formed around the end spliced portion by using a cup-shaped container instead of the protective sheet and filling the waterproofing agent into the container. The waterproof structure of the end spliced portion is described below.

Figure 3:
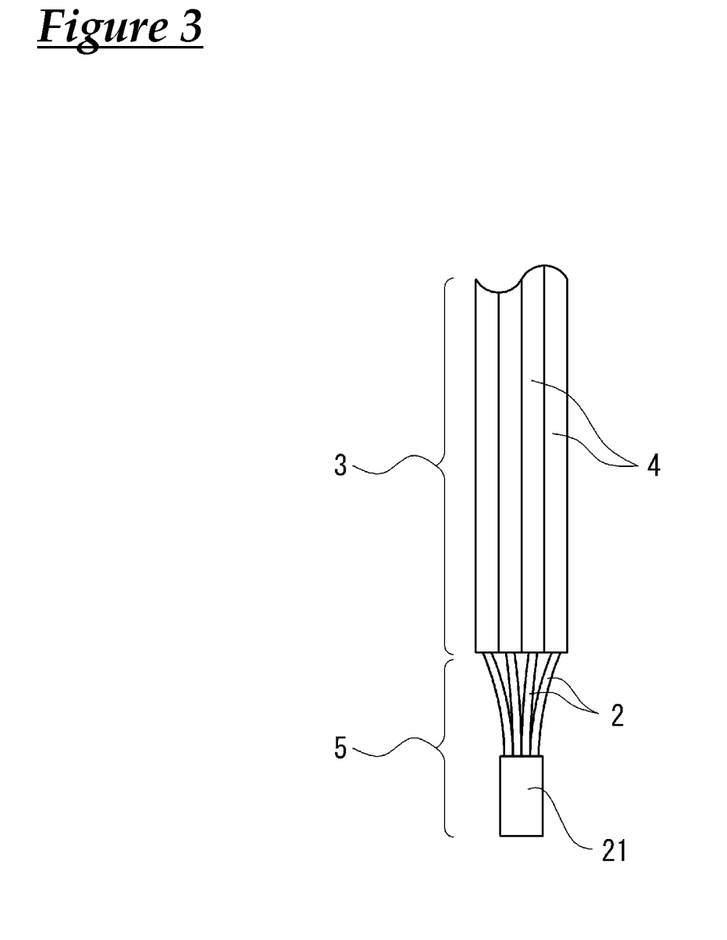
FIG. 3 is a diagram schematically showing a wire bundle having a spliced portion on an end.

FIG. 3 is a diagram schematically showing a wire bundle including a spliced portion on an end. In the wire bundle shown in FIG. 3, a core exposed portion 5 in which coating materials 3 of a plurality of insulated wires 4 are stripped to expose conductors 2 is provided on an end of the wire bundle. The core exposed portion 5 includes an end spliced portion 21 in which ends of a plurality of exposed conductors 2 are connected. In the end spliced portion 21, the plurality of insulated wires 4 are electrically connected. The conductors 2 of the end spliced portion 21 are connected using a joining method such as crimping (melting crimping) or welding as for the intermediate spliced portion 21.

Figure 4:
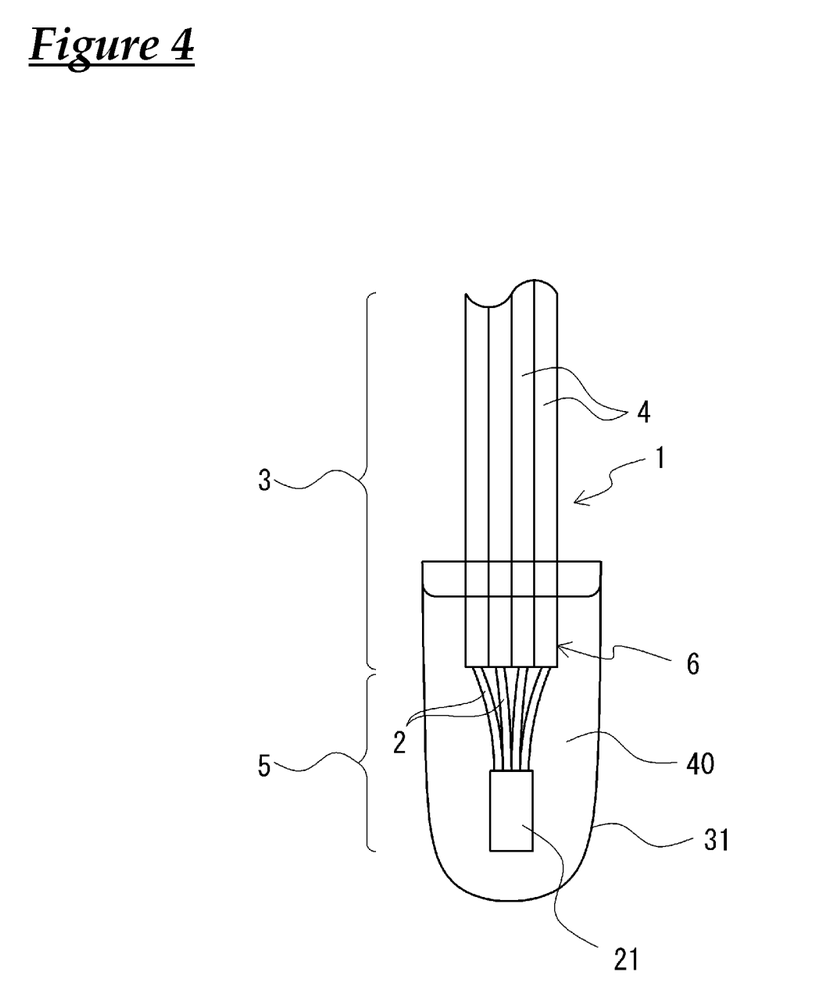
FIG. 4 is a diagram near an end spliced portion of another example of the wiring harness of the present invention.
Figure 5A:
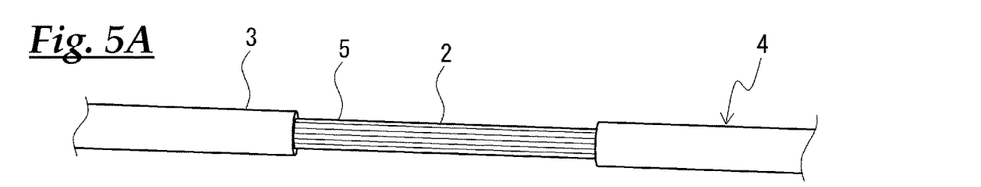
FIG. 5A shows a step of preparing a plurality of coated wires.
Figure 5B:
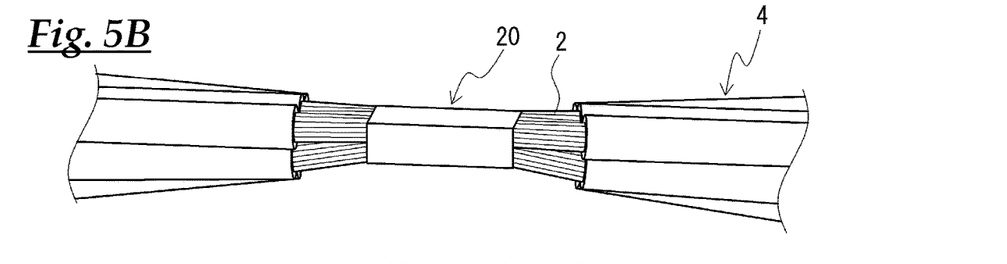
FIG. 5B shows a step of forming the plurality of coated wires into a wire bundle with an intermediate spliced portion.
Figure 5C:
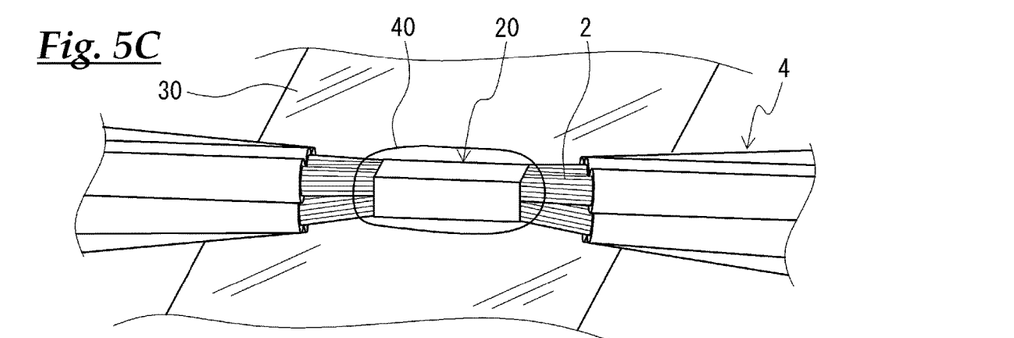
FIG. 5C shows a step of placing the wire bundle with the intermediate spliced portion on a protective sheet and supplying a waterproofing agent onto the intermediate spliced portion.
Figure 5D:
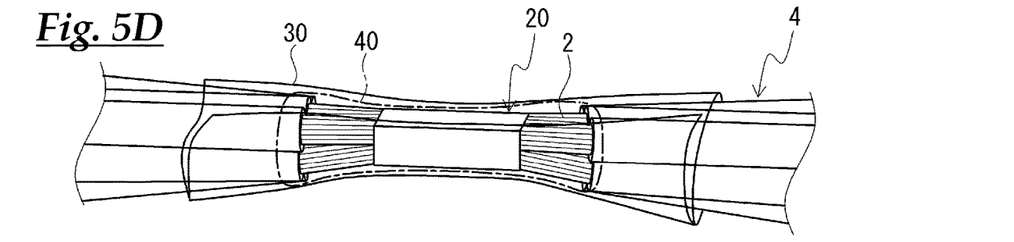
FIGS. 5D and 5E show a step of wounding the protective sheet around the intermediate spliced portion and the waterproofing agent.
Figure 5E:
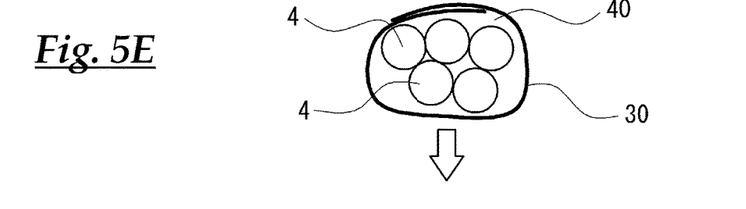

FIG. 4 shows another example of the wiring harness of the present invention near an end spliced portion. The wiring harness 1 shown in FIG. 4 includes a covered portion 6 in which the periphery of an end spliced portion 21 is covered with a waterproofing agent 40 sealed in a transparent container 31 formed of a PVC cap. In the covered portion 6, the entire periphery of the core exposed portion 5 and the outer peripheral surfaces of end parts of coating materials 3 adjacent to the core exposed portion 5 are continuously covered with the waterproofing agent 40. The wiring harness 1 has a waterproof structure in which the core exposed portion 5 and a part of the coating material 3 are sealed by the waterproofing agent 40 in this way.

The wiring harness 1 shown in FIG. 4 is manufactured by filling, for example, an ultraviolet curable crosslinked acrylic adhesive as a reactive adhesive of the waterproofing agent 40 into the transparent container 31 and immersing the end spliced portion 21 and the end parts of the coating materials 3 in the waterproofing agent 40 in the container 31. Subsequently, ultraviolet rays or the like are irradiated laterally to the transparent container 31 to cure the ultraviolet curable crosslinked acrylic adhesive. The wiring harness 1 in a state where the covered portion 6 including the end spliced portion 21 is sealed by the waterproofing agent 40 is obtained.

The wiring harness of the present invention can be suitably used as an in-vehicle wiring harness to be exposed in a high-temperature environment during use and required to have the waterproof performance of the spliced portion.

EXAMPLES

Examples and comparative examples of the present invention are described below. Note that the present invention is not limited to these examples.

Examples 1 to 6, Comparative Examples 1 to 3

Waterproofing was applied to intermediate spliced portions of wire bundles using adhesives having compositions shown in Tables 1 and 2 and prepared as waterproofing agents to fabricate wiring harnesses of Examples 1 to 6 and Comparative Examples 1 to 3, and the waterproof performance of the intermediate spliced portions was tested. In Examples 1 to 6, gel fractions of the reactive adhesives were in a range of 20 to 70%. In Comparative Examples 1 to 3, gel fractions of the adhesives were outside the range of 20 to 70%. The gel fraction of a solvent acrylic adhesive was adjusted by adjusting the amount of a curing agent. Further, the gel fraction of an ultraviolet curable acrylic adhesive was adjusted by adjusting an UV irradiation amount. Results of a waterproof performance test, the gel fractions of the waterproofing agents, resin dripping after a high-temperature test and the like are shown in Tables 1 and 2. The details of materials used in the waterproofing agents of Tables 1 and 2, a waterproof intermediate spliced portion fabrication method, a waterproof test method and the like are described below.

(1) Used Materials

Solvent acrylic adhesive: produced by Soken Chemical & Engineering Co., Ltd., product name "SK Dyne 1310" (33 mass % of solid content)

Curing agent: isocyanate-based curing agent, produced by Soken Chemical & Engineering Co., Ltd., product name "L-45"

UV curable acrylic adhesive: ultraviolet curable urethane acrylate, produced by Nippon Synthetic Chemical Industries Co., Ltd., product name "UV-3000B"

(2) Air Leak Test (2-1) Fabrication of Intermediate Spliced Test Specimen

Five PVC coated wires (outer diameter of 2.1 mm, length of 300 mm) 4 each including a coating material made of polyvinyl chloride resin containing 30 mass parts of plasticizer (DINP) were prepared, a central part of each coating material 3 was stripped over a length of 20 mm to form a conductor exposed portion as shown in FIG. 5($a$) and parts of the conductors having a width of 10 mm out of the exposed conductor exposed portion 5 were ultrasonically welded to form an intermediate spliced portion 20, thereby forming a wire bundle as shown in FIG. 5($b$). Subsequently, as shown in FIG. 5($c$), the intermediate spliced portion 20 of this wire bundle is placed on a transparent PVC film 30 having a longitudinal dimension of 70 mm, a lateral dimension of 70 mm and a thickness of 10 μm and 0.9 g of an adhesive having a composition shown in Tables 1 and 2 was dripped with the conductor exposed portion set as a center. Subsequently, the PVC film 30 was wound as shown in FIGS. 5($d$) and 5($e$). After winding, the wire bundle was heated and dried to cure the adhesive in the case of the solvent acrylic adhesive or ultraviolet rays were irradiated to cure the adhesive in the case of the UV curable acrylic adhesive to produce an intermediate spliced test specimen. Curing conditions of the solvent acrylic adhesive was 120° C. and 30 minutes. Further, in the case of the UV curable acrylic adhesive, a high-pressure mercury lamp (light quantity of 70 mW/cm$^2$, measurement wavelength of 365 nm) was used and light irradiation was performed once from each of upper and lower sides of the intermediate spliced portion, i.e. a total of twice with an integrated light quantity shown in Tables 1 and 2 for curing.

(3-3) Waterproof Performance Evaluation by Pressure Test (Air Leak Test)

Figure 6:
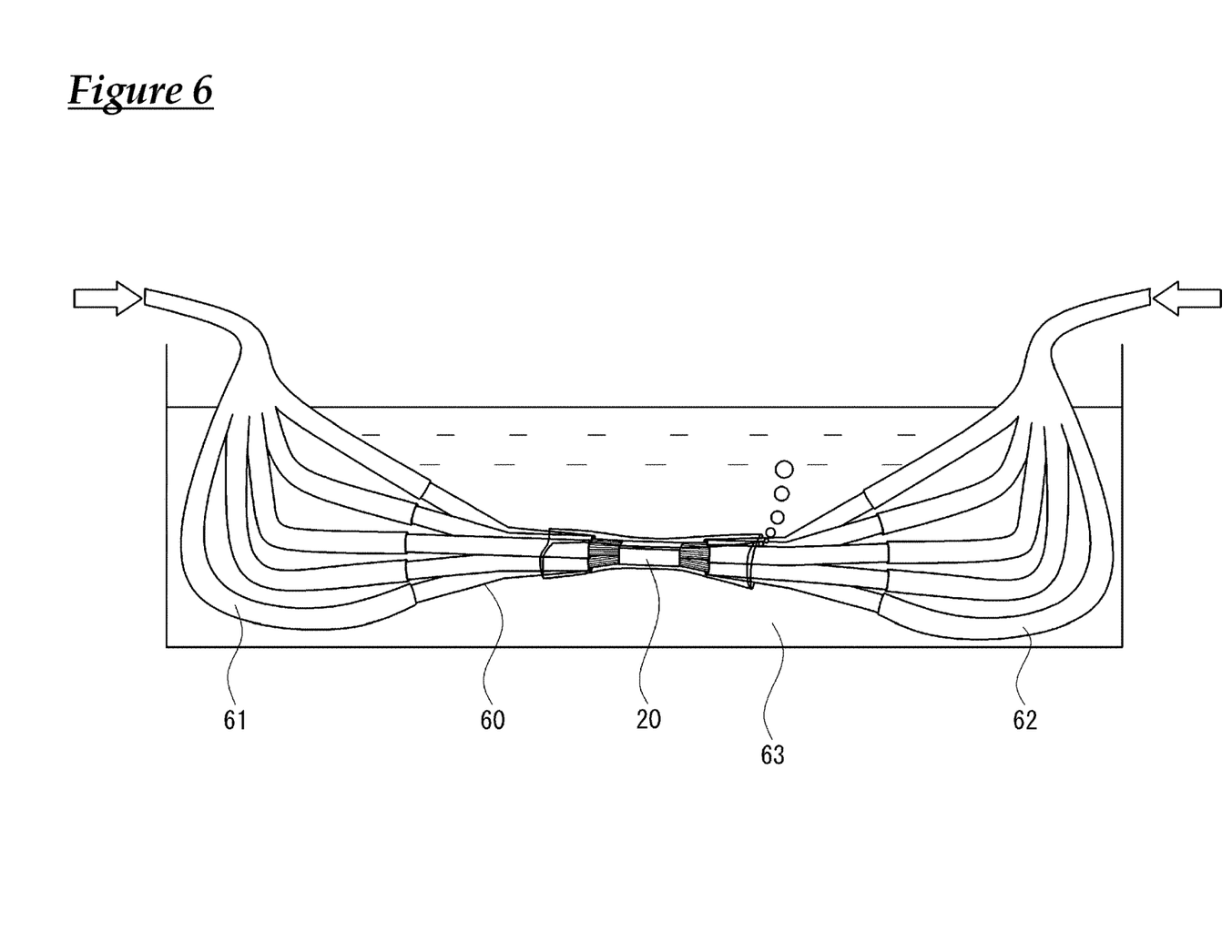
FIG. 6 is a diagram showing a method of a pressure leak test for the wiring harness of the embodiment.

In a pressure test, as shown in FIG. 6, as many prepared rubber tubes 61, 62 as the insulated wires were inserted into both ends of the intermediate spliced test specimen 60 for each wire and an air pressure of 100 kPa was applied from the rubber tubes 61, 62 on the both ends with the entire test specimen placed in water 63. The test specimen was evaluated to be satisfactory (o) if there was no air leakage from the intermediate spliced portion 20, whereas the test specimen was evaluated to be failure (x) if there is any air leakage.

The above pressure test was respectively performed in an initial stage, after a wet heat test and after a high-temperature test. Further, after the high-temperature test, a test piece was observed before the pressure test and resin dripping was evaluated. Test results are shown in Tables 1 and 2. The details of the wet heat test, the high-temperature test and a resin dripping test method are as follows.

[After Wet Heat Test]

The test specimen was left in a wet hot environment having a temperature of 90° C. and a RH of 95% for 144 hours and the air leak test was conducted after the test specimen was taken out and gradually cooled.

[After High-Temperature Test]

The test specimen was left in a high-temperature environment of 120° C. for 144 hours and the air leak test was conducted after the test specimen was taken out and gradually cooled and the presence or absence of resin dripping was confirmed.

[Determination Criteria for Resin Dripping]

Resin dripping after the above high-temperature test was determined based on the following criteria by observing the test specimen.

⊚ (good): There was no extrusion of the adhesive from an end part of the PVC film.

o (satisfactory): The resin flowed out between the wires outside the PVC film (no dripping).

x (failure): The adhesive flowed to the outside of the PVC film and dripped.

(3-4) Gel Fraction Measurement Method

Each adhesive written in Tables 1 and 2 was cured as in the case of the above air leak test and the gel fraction was measured by the following test method using about 0.1 g of a hardened material. After the mass was measured, the hardened material was immersed in ethyl acetate of 23° C. for 20 hours and, then, dried at 120° C. for 1 hour and the mass after immersion was measured. The gel fraction was obtained by the following equation from the masses of the hardened material before and after immersion in a solvent.

Gel fraction (%) = mass after immersion/mass before immersion × 100

TABLE 1

|  | | Examples | | | | | |
| --- | --- | --- | --- | --- | --- | --- | --- |
|  | | 1 | 2 | 3 | 4 | 5 | 6 |
| Composition of Reactive Adhesive | | | | | | | |
| Solvent acrylic adhesive (mass parts) | | 100 | — | 100 | — | 100 | — |
| Curing agent (mass parts) | | 0.3 | — | 0.6 | — | 0.8 | — |
| UV curable acrylic adhesive (mass parts) | | — | 100 | — | 100 | — | 100 |
| UV irradiation amount (mJ/cm²) | | — | 35 | — | 70 | — | 140 |
| Gel fraction (%) | | 20 | 30 | 45 | 55 | 66 | 69 |
| Test results | | | | | | | |
| Air leak test | Initial stage | o | o | o | o | o | o |
|  | After wet heat test | o | o | o | o | o | o |
|  | After High-temperature test | o | o | o | o | o | o |
| Resin dripping after high-temperature test | | o | o | ⊚ | ⊚ | ⊚ | ⊚ |

TABLE 2

|  | | Comparative Examples | | |
| --- | --- | --- | --- | --- |
|  | | 1 | 2 | 3 |
| Composition of Reactive Adhesive | | | | |
| Solvent acrylic adhesive (mass parts) | | 100 | 100 | — |
| Curing agent (mass parts) | | 0 | 1.2 | — |
| UV curable acrylic adhesive (mass parts) | | — | — | 100 |
| UV irradiation amount (mJ/cm²) | | — | — | 700 |
| Gel fraction (%) | | 0 | 85 | 95 |
| Test results | | | | |
| Air leak test | Initial stage | o | o | o |
|  | After wet heat test | o | X | X |
|  | After high-temperature test | o | X | X |
| Resin dripping after high-temperature test | | X | ⊚ | ⊚ |

As shown in Table 1, Examples 1 to 6 were satisfactory in the evaluation of the air leak test in the initial state, after the wet heat test and after the high-temperature test. Further, resin dripping after the high-temperature test was good or satisfactory.

As shown in Table 2, the gel fraction of Comparative Example 1 was zero since no curing agent was added to the solvent acrylic adhesive and, hence, there was no crosslinking. Comparative Example 1 was satisfactory in the air leak test due to an adhesive force of the adhesive, but resin dripping occurred after the high-temperature test since the adhesive was not cured.

Comparative Example 2 was satisfactory in dripping after the high-temperature test since being a solvent acrylic adhesive and having a gel fraction of 85% exceeding 70%, but became too hard after the wet heat test and after the high-temperature test and, hence, the result of the air leak test was a failure.

Comparative Example 3 was satisfactory in dripping after the high-temperature test since being a solvent acrylic adhesive and having a gel fraction exceeding 70%, but became too hard after the wet heat test and after the high-temperature test and, hence, the result of the air leak test was a failure.

Although the embodiment of the present invention has been described in detail above, the present invention is not limited to the above embodiment at all and various modifications can be made without departing from the gist of the present invention.

The invention claimed is:

1. A wiring harness having a waterproof structure, comprising:
    a plurality of insulated wires arranged in a bundle, each of the insulated wires includes a covered portion where a coating material made of a semi-rigid vinyl chloride resin or a soft vinyl chloride resin covers a conductor and a conductor exposed portion where the coating material is partially removed from the conductor so as to expose the conductor,
    a spliced portion formed by joining the conductor exposed portions of the plurality of insulated wires in a conductor part
    a waterproofing agent surrounding the spliced portion and continuously covering an outer peripheral surface of an end part of the coating material of each of the insulated wires adjacent to the conductor exposed portion so as to seal the conductor exposed portion, and
    a protective sheet covering a periphery of the waterproofing agent, the protective sheet is flexible so as to deform when the protective sheet is wrapped around the waterproofing agent, wherein:
    a reactive adhesive having a gel fraction in a range of 20 to 70% is used as the waterproofing agent.

2. The wiring harness of claim 1, wherein the reactive adhesive is an ultraviolet curable crosslinked acrylic adhesive.

3. The wiring harness of claim 1, wherein the reactive adhesive is a two-component curable crosslinked acrylic adhesive.

4. The wiring harness of claim 1, wherein the protective sheet has a thickness of 100 µm or smaller.

5. The wiring harness of claim 1, wherein the spliced portion is an intermediate spliced portion.

6. The wiring harness of claim 1, wherein the spliced portion is an end spliced portion.

7. The wiring harness of claim 1, wherein the protective sheet is light permeable to ultraviolet light so that ultraviolet light can be used to cure the reactive adhesive of the waterproofing agent through the protective sheet.

8. The wiring harness of claim 7, wherein the protective sheet is light permeable to ultraviolet light so that ultraviolet light transmittance is 50% or higher.

* * * * *